(12) United States Patent
Mukhopadhyay et al.

(10) Patent No.: US 10,313,151 B2
(45) Date of Patent: Jun. 4, 2019

(54) ENHANCED LOOP-BREAKING PROTOCOL TO SUPPORT CONNECTIONLESS AND CONNECTION-ORIENTED ETHERNET

(71) Applicant: FUJITSU LIMITED, Kawasaki-shi, Kanagawa (JP)

(72) Inventors: Maitreya Mukhopadhyay, Allen, TX (US); Michael Colven, Dallas, TX (US); Wenao Hu, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 682 days.

(21) Appl. No.: 14/596,896

(22) Filed: Jan. 14, 2015

(65) Prior Publication Data

US 2016/0204957 A1 Jul. 14, 2016

(51) Int. Cl.
*H04L 12/437* (2006.01)
*H04L 12/46* (2006.01)
*H04L 12/705* (2013.01)

(52) U.S. Cl.
CPC ............ *H04L 12/462* (2013.01); *H04L 45/18* (2013.01)

(58) Field of Classification Search
CPC ................................ H04L 45/18; H04L 12/40
See application file for complete search history.

(56) References Cited

U.S. PATENT DOCUMENTS

| | | | | |
|---|---|---|---|---|
| 5,014,262 | A * | 5/1991 | Harshavardhana | ..... H04L 45/00 340/2.1 |
| 2008/0049621 | A1* | 2/2008 | McGuire | ............. H04L 12/6418 370/236.2 |
| 2010/0302936 | A1* | 12/2010 | Jain | .......................... H04L 45/04 370/225 |
| 2011/0222396 | A1* | 9/2011 | Tochio | .................. H04L 12/437 370/222 |
| 2013/0003601 | A1* | 1/2013 | Gupta | .................... H04L 12/462 370/254 |
| 2015/0055486 | A1* | 2/2015 | Maggiari | ............. H04L 41/5035 370/242 |
| 2017/0063617 | A1* | 3/2017 | Sudharshan | ........... H04L 12/462 |

* cited by examiner

*Primary Examiner* — Asad M Nawaz
*Assistant Examiner* — Syed Ali
(74) *Attorney, Agent, or Firm* — Baker Botts L.L.P.

(57) ABSTRACT

A method and system for breaking loops in an Ethernet network that supports connectionless and connection-oriented Ethernet. A loop-breaking protocol may be used to detect a loop among a plurality of network elements and to identify a port to block in order to break the loop. The network elements may stop the flow of connectionless Ethernet traffic, while continuing to allow connection-oriented Ethernet traffic to pass. The loop-breaking protocol may be further configured to analyze and understand connection-oriented Ethernet within the network so that connection-oriented Ethernet paths are accounted for during loop detection and prevention.

11 Claims, 6 Drawing Sheets

ENHANCED LOOP-BREAKING PROTOCOL TO SUPPORT CONNECTIONLESS AND CONNECTION-ORIENTED ETHERNET

BACKGROUND

Field of the Disclosure

The present disclosure relates to computer networking and, specifically, to Ethernet networking.

Description of the Related Art

Ethernet networks are often comprised of network elements communicating information back and forth to each other. Information may be communicated between network elements in the form of data packets, or blocks of data individually sent and delivered. The network elements (e.g., routers, switches, and/or bridges) may process incoming data packets, and then forward them out on the appropriate links of the network elements to the target destination.

By design, Ethernet is a connectionless network architecture, permitting information to be sent into the network without prior arrangement or configuration. Connection-oriented Ethernet may extend connectionless Ethernet to allow the provisioning of paths and/or resources within the network prior to the sending information. Both connectionless and connection-oriented Ethernet have advantages and disadvantages, and therefore, it may be desirable to support both technologies within a network at the same time.

SUMMARY

In one aspect, a disclosed method for breaking loops in an Ethernet network includes using a loop-breaking protocol to select a first port of a network element to block in order to break a network loop among a plurality of network elements that form a network. The method may include determining whether traffic egressing from the first port is connectionless Ethernet traffic or connection-oriented Ethernet traffic; blocking connectionless Ethernet traffic at the first port of the network element to break the network loop; and while blocking the connectionless Ethernet traffic, permitting connection-oriented Ethernet traffic to pass through the first port of the network element.

Additional disclosed aspects for breaking loops in an Ethernet network include determining whether a second network loop exists among the plurality of network elements due to a connection-oriented Ethernet link within the plurality of network elements; using the loop-breaking protocol to select a second port to block in order to break the second network loop; blocking the connectionless Ethernet traffic at the second port to break the second network loop; and while blocking the connectionless Ethernet traffic, permitting connection-oriented Ethernet traffic to pass through the second port.

DESCRIPTION OF PARTICULAR EMBODIMENT(S)

Figure 1:
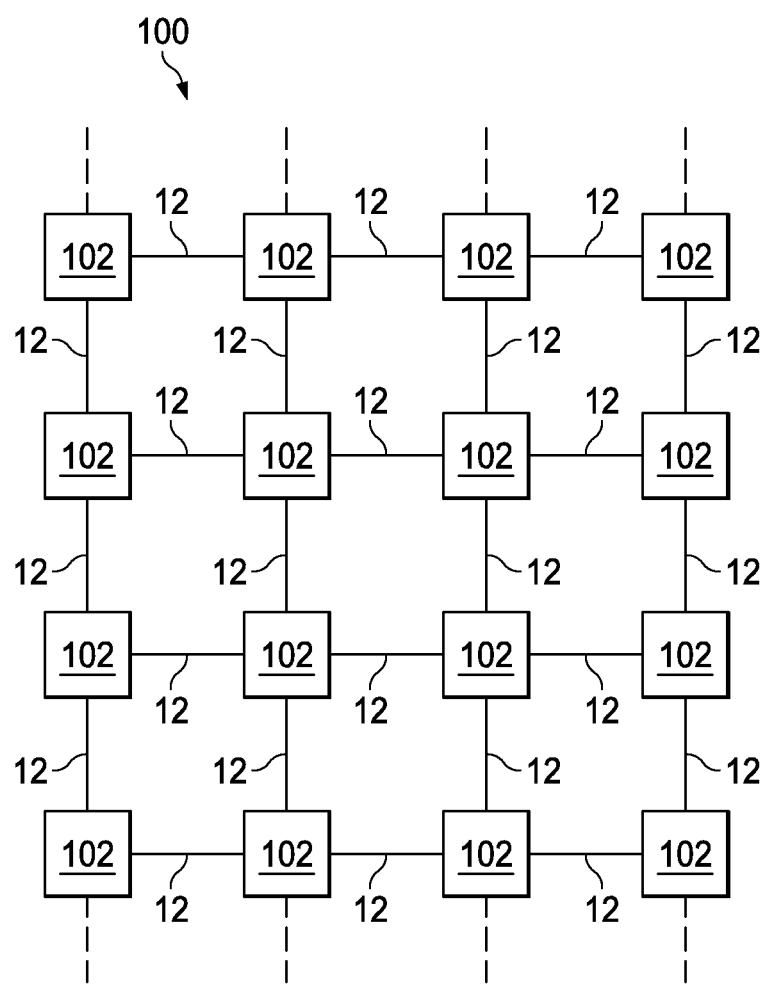
FIG. 1 is a block diagram of selected elements of an embodiment of a network according to the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "72-1" refers to an instance of a device class, which may be referred to collectively as devices "72" and any one of which may be referred to generically as device "72".

Ethernet networks may be designed with connectionless and/or connection-oriented Ethernet. In connectionless Ethernet, a network element may function as a bridge, analyzing incoming data packets and directing them to the appropriate outgoing links based on the destination address of the data packet. The bridge may learn the network topology by analyzing the source addresses of the incoming data packets at each link and building an address table of network elements connected to that link. When an incoming data packet arrives, the bridge may look for the destination address within its network address table to determine which outgoing link to send the data packet out on. If the destination address is not in the address table, then the bridge may flood the data packet on to all outgoing links. Any loop among the network elements may cause a network storm to occur as the network elements rebroadcast the data packet, ultimately reaching back to the source. A network storm may result in degradation of the network or possibly even network failure as rebroadcasting of data packets consumes exponentially increasing network resources. In order to avoid a network storm, connectionless Ethernet may use loop-breaking technologies, such as a spanning tree protocol (e.g., xSTP) or Ethernet Ring Protection Switching (e.g., G.8032), to block ports at particular network elements in order to ensure a loop-free network topology. Accordingly, connectionless Ethernet may function as a multipoint-to-multipoint service.

By contrast, connection-oriented Ethernet may provide point-to-point service in which data packets are forwarded across a pre-determined path of network elements. With a pre-determined path, connection-oriented Ethernet may provide robustness and performance guarantees otherwise unavailable in connectionless Ethernet. Therefore, connection-oriented Ethernet may provide a better method of point-to-point service in a network as compared to connectionless Ethernet. Additionally, connection-oriented Ethernet is inherently loop free because connection-oriented Ethernet traffic is never flooded between the network elements.

In order to maximize network resources, it may be desirable to support connectionless and connection-oriented Ethernet across the same network. To do so, existing loop-breaking protocols may be enhanced to identify and handle connection-oriented Ethernet links within the network. Otherwise, the loop-breaking protocols may disable connection-oriented Ethernet links or fail to render a loop-free network topology. As will be described in detail herein, the present disclosure provides a novel solution for supporting both connectionless and connection-oriented Ethernet on the same network without sacrificing the robustness and performance of the connection-oriented Ethernet network, yet still preventing loops and resulting network storms.

Referring now to the drawings, FIG. 1 is a block diagram showing selected elements of an embodiment of transport network 100. In various embodiments, transport network 100 may be an Ethernet network. Transport network 100 includes one or more transmission media 12 operable to transport one or more signals communicated by components of transport network 100. The components of transport network 100, coupled together by transmission media 12, may include a plurality of network elements 102. In the illustrated transport network 100, each network element 102 is coupled to four other nodes. However, any suitable configuration of any suitable number of network elements 102 may create transport network 100. Although transport network 100 is shown as a mesh network, transport network 100 may also be configured as a ring network, a point-to-point network, or any other suitable network or combination of networks. Transport network 100 may be used in a short-haul metropolitan network, a long-haul inter-city network, or any other suitable network or combination of networks.

Each transmission medium 12 may include any system, device, or apparatus configured to communicatively couple network elements 102 to each other and communicate information between them. For example, a transmission medium 12 may include an optical fiber, an Ethernet cable, a T1 cable, a Wi-Fi or Bluetooth connection, and/or any other suitable medium.

Transport network 100 may communicate information or "traffic" over transmission media 12. As used herein, "traffic" means information transmitted, stored, or sorted in transport network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via transport network 100 may be structured in any appropriate manner including, but not limited to, frames or packets.

Each network element 102 in transport network 100 may comprise any suitable system operable to transmit and receive network traffic. For example, network element 102 may be a hub, router, switch, bridge, or any other system or device operable to transmit and receive network traffic. In the illustrated embodiment, each network element 102 may be operable to transmit traffic directly to one or more other network elements 102 and receive traffic directly from one or more other network elements 102 via transmission medium 12.

Modifications, additions, or omissions may be made to transport network 100 without departing from the scope of the disclosure. The components and elements of transport network 100 described may be integrated or separated according to particular needs. Moreover, the operations of transport network 100 may be performed by more, fewer, or other components.

Figure 2:
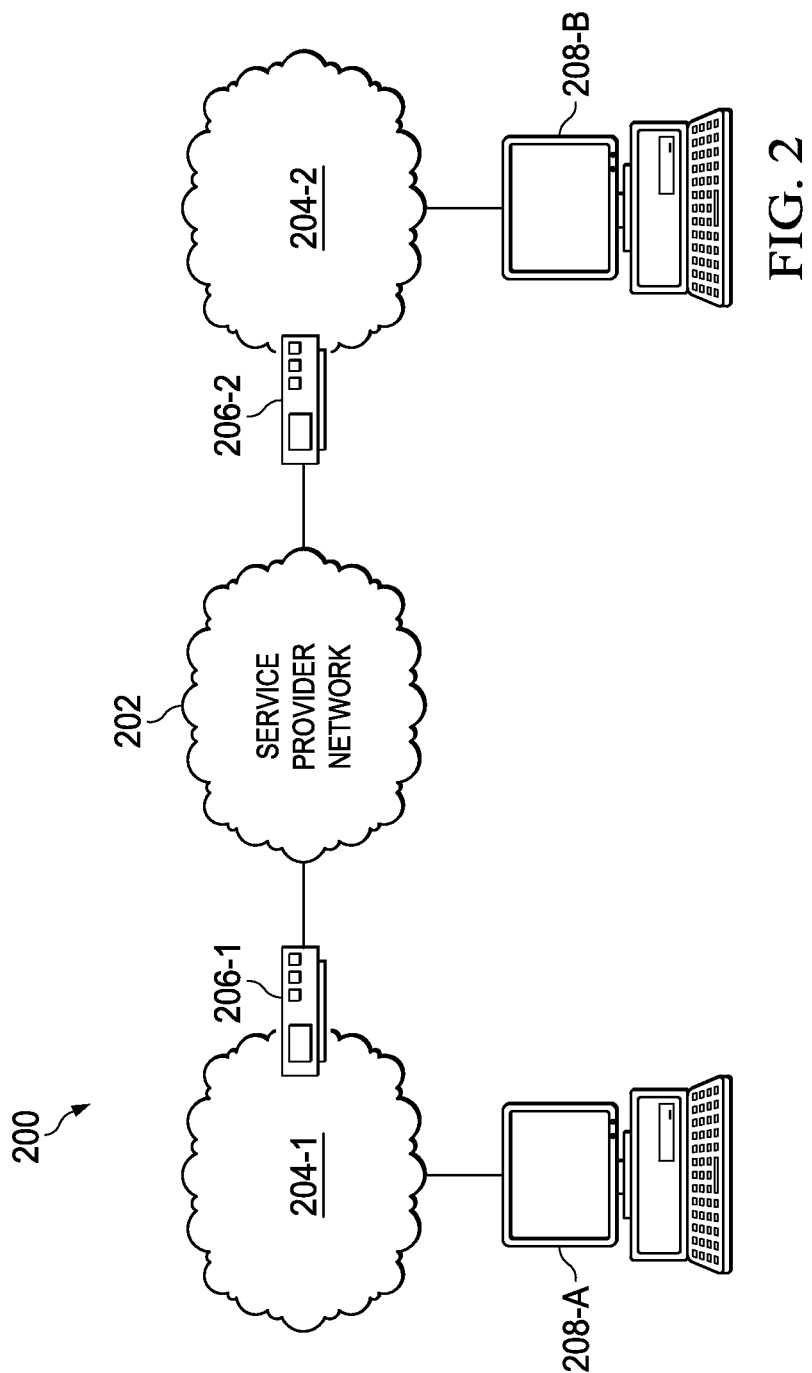
FIG. 2 is a block diagram of selected elements of an embodiment of a general network architecture according to the present disclosure.

In FIG. 2, customer network 204 is shown as two distinct sub-networks, customer network 204-1 and customer network 204-2. Customer networks 204-1 and 204-2 may be communicatively coupled through service provider network 202. Namely, service provider network 202 may be configured to receive and transport traffic between the sub-networks. In particular embodiments, customer network 204-1, customer network 204-2, and/or service provider network 202 may include one or more transport networks 100 described above with respect to FIG. 1. Customer networks 204-1 and 204-2 may couple to service provider network 202 via one or more customer edge devices 206, representing a user network interface or a demarcation between customer network 204 and service provider network 202. Customer edge device 206 may be any suitable system operable to transmit and receive network traffic, such as network element 102 disclosed with respect to FIG. 1. As an example and not by way of limitation, customer edge device 206 may be a router or switch located at or near the customer premises.

One or more customer systems 208 may be communicatively coupled to customer network 204. For example, customer system 208-A may be coupled to customer network 204-1, and customer system 208-B may be coupled to customer network 204-2. Although shown as a computer systems, customer system 208 may be any device that communicatively couples to a network, including for example, a computer, a PDA, a consumer electronic device, a network storage device, a network printer, or another suitable device and may vary in size, shape, performance, functionality, and price. Customer system 208-A may desire to communicate information with customer system 208-B or another system coupled to customer network 204-2. However, customer networks 204-1 and 204-2 may be located at different physical locations or otherwise lack a direct network connection. Therefore, a customer may engage the services of a service provider, in the form of service provider network 202, to communicate information between customer networks 204-1 and 204-2. Thus, service provider network 202 may provide forwarding of network traffic between various customer systems 208 coupled to customer networks 204-1 and 204-2. Specifically, service provider network 202 may provide connectionless or connection-oriented Ethernet links to communicatively couple customer networks 204-1 and 204-2, such that in some embodiments, it may appear as though the two networks are a single local area network (LAN).

Figure 3:
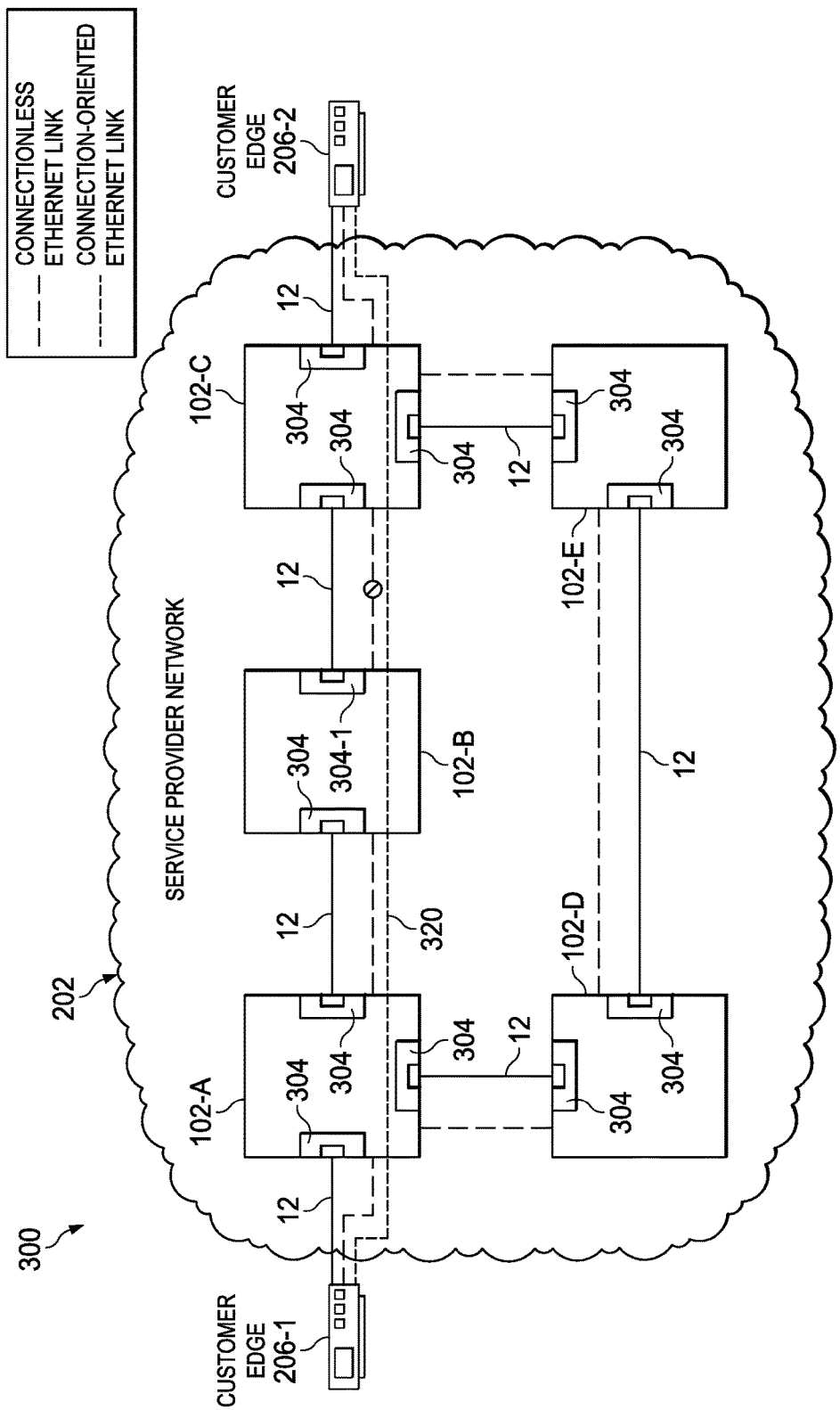
FIG. 3 is a block diagram of selected elements of an embodiment of a network architecture supporting connectionless and connection-oriented Ethernet according to the present disclosure.

In FIG. 3, a block diagram of selected elements of an embodiment of exemplary network architecture 300 is illustrated in which connectionless and connection-oriented Ethernet links are implemented within the same network. Customer edge device 206-1 and customer edge device 206-2 may be communicatively coupled via service provider network 202, which may represent an implementation of transport network 100 described above with respect to FIG. 1.

Service provider network 202 may include network elements 102 coupled by transmission media 12 through ports 304.

Network elements 102 may support both connectionless and connection-oriented Ethernet links through the same ports 304. For example, a connectionless Ethernet link may exist between each network element 102 in service provider network 202. Additionally, customer edge device 206-1 and customer edge device 206-2 may be communicatively coupled by a connection-oriented Ethernet link 320, providing point-to-point service between the two customer edge devices. Connection-oriented Ethernet link 320 may use ports 304 along network elements 102-A→102-B→102-C. Further, connection-oriented Ethernet link 320 may act as a virtual circuit, and may cause customer edge device 206-1 and customer edge device 206-2 to appear as a LAN to the customer.

In some embodiments, connection-oriented Ethernet link 320 may provide certain network performance guarantees between customer edge device 206-1 and customer edge device 206-2. For example, connection-oriented Ethernet link 320 may be pre-provisioned to take a particular path within service provider network 202. As illustrated in FIG. 3, the path of connection-oriented Ethernet link 320 may be through network elements 102-A→102-B→102-C. The network path may be selected based on requested and/or available network resources, such as throughput of the network elements, transmission media between the elements, geographic location of the elements, existing network usage, and/or any other factors affecting the network. Additionally, the network path for connection-oriented Ethernet link 320 may be set in the control plane by, for example, a management plane application or an embedded control plane. With the path through the service provider network 202 set, bandwidth and queuing resources may be allocated and reserved at the various network elements along the path. And with proper resource allocation along the connection-oriented Ethernet link 320, traffic engineering and management may also be possible to ensure certain performance and quality of service across the link. Thus, connection-oriented Ethernet link 320 may provide a guaranteed quality of service beyond what would otherwise be possible through the connectionless Ethernet links within service provider network 202.

Because service provider network 202 supports connectionless Ethernet links along the same network elements 102 and the same ports 304 as connection-oriented Ethernet link 320, a loop-breaking protocol may be used to prevent a network storm that could be caused by flooding. The loop-breaking protocol may disable a particular port(s) 304 at network elements 102 to ensure a loop-free topology within the network. An example loop-breaking protocol includes, but is not limited to, a spanning tree protocol (e.g., xSTP) or Ethernet Ring Protection Switching (e.g., G.8032).

However, disabling ports 304 with a loop-breaking protocol within a network supporting both connectionless and connection-oriented Ethernet links may have the unintended consequence of disabling connection-oriented Ethernet link 320. For example, the loop-breaking protocol may disable port 304-1 to break the loop among network elements 102-A→102-B→102-C→102-E→102-D. But, disabling port 304-1 may also disable traffic on connection-oriented Ethernet link 320 also using port 304-1. That is, port 304-1 may no longer be available to communicate data packets for connection-oriented Ethernet link 320 as a result of the loop-breaking protocol. Therefore, with port 304-1 disabled, connection-oriented Ethernet link 320 may also be disabled.

Therefore, in some embodiments, the loop-breaking protocol may be modified to block the connectionless Ethernet loop while not affecting connection-oriented Ethernet links using the same port. For example, the loop-breaking protocol may selectively block connectionless Ethernet traffic at a port 304, while continuing to permit traffic for connection-oriented Ethernet link 320 to pass.

To distinguish between connectionless and connection-oriented Ethernet traffic, network element 302 may rely on, for example, V-LAN tags, bit flags, protocol (e.g., 8031) extensions, or any other method for distinguishing connectionless from connection-oriented Ethernet traffic. To illustrate, service provider network 202 may be configured to set a bit flag within connection-oriented Ethernet packets so that network elements 102 may distinguish between connectionless and connection-oriented Ethernet traffic. The setting of such a flag may occur, for example, at customer network 204, at customer edge 206, or upon the traffic entering service provider network 202. Upon detecting the flag, network elements 102 may know that the data packet is connection-oriented Ethernet traffic.

Figure 4:
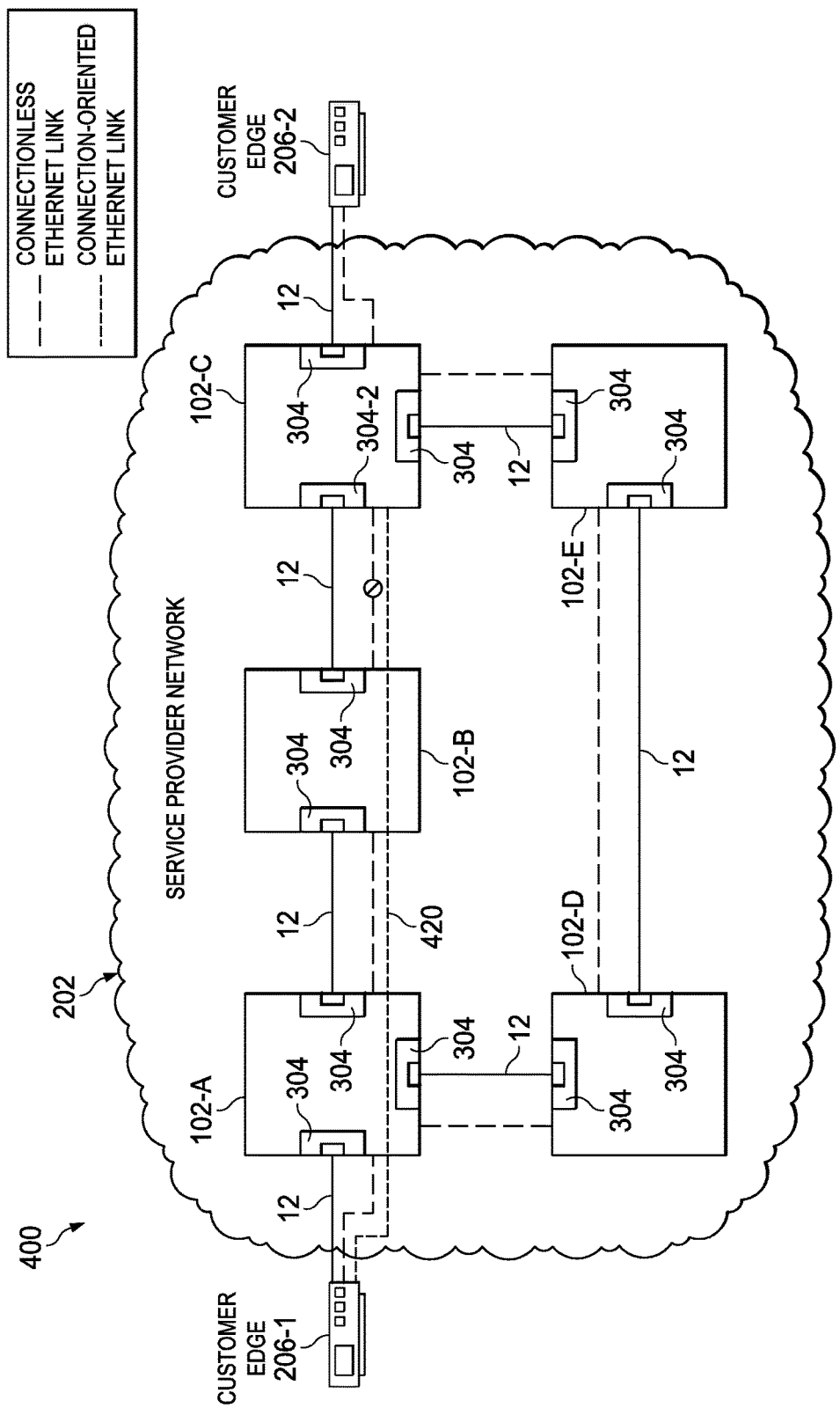
FIG. 4 is a block diagram of selected elements of another embodiment of a network architecture supporting connectionless and connection-oriented Ethernet according to the present disclosure.

A transport network between two customer networks may also be configured to use a combination of connectionless and connection-oriented Ethernet links. For example, FIG. 4 illustrates network architecture 400 in which customer edge device 206-1 may communicatively couple to customer edge device 206-2 via both connectionless and connection-oriented Ethernet links. As illustrated, customer edge device 206-1 may use connection-oriented Ethernet link 420 up to network element 102-C, at which point connectionless Ethernet links may be used for the remainder of the path to customer edge device 206-2. Traffic on connection-oriented Ethernet link 420 may enter the flood domain at network element 102-C, where the connectionless Ethernet link ends. Accordingly, traffic from customer edge device 206-1 to customer edge device 206-2 may use a combination of both connectionless and connection-oriented Ethernet links in travelling between the customer networks.

A loop-breaking protocol may be run on service provider network 202 to prevent a network storm. The loop-breaking protocol may detect that a loop exists between network elements 102 (e.g., network elements 102-A→102-B→102-C→102-E→102-D) in service provider network 202. To break the loop, the loop-breaking protocol may disable port 304-2. Blocking traffic at port 304-2 may break the connectionless Ethernet loop, but may also cause connection-oriented Ethernet link 420 to fail. To prevent such a failure, in some embodiments, the loop-breaking protocol may be enhanced to permit traffic on connection-oriented Ethernet link 420 terminating at network element 102-C to continue through port 304-2, while blocking traffic on the connectionless Ethernet link at port 304-2. Accordingly, the loop-breaking protocol may be configured to recognize that although the connection-oriented Ethernet link 420 terminates and enters the flood domain at port 304-2 of network element 102-C, connection-oriented Ethernet traffic should not be blocked at this port.

As discussed above, network element 102 may rely on for example, V-LAN tags, bit flags, protocol (e.g., 8031) extensions, or any other method for distinguishing connectionless and connection-oriented Ethernet traffic.

Figure 5:
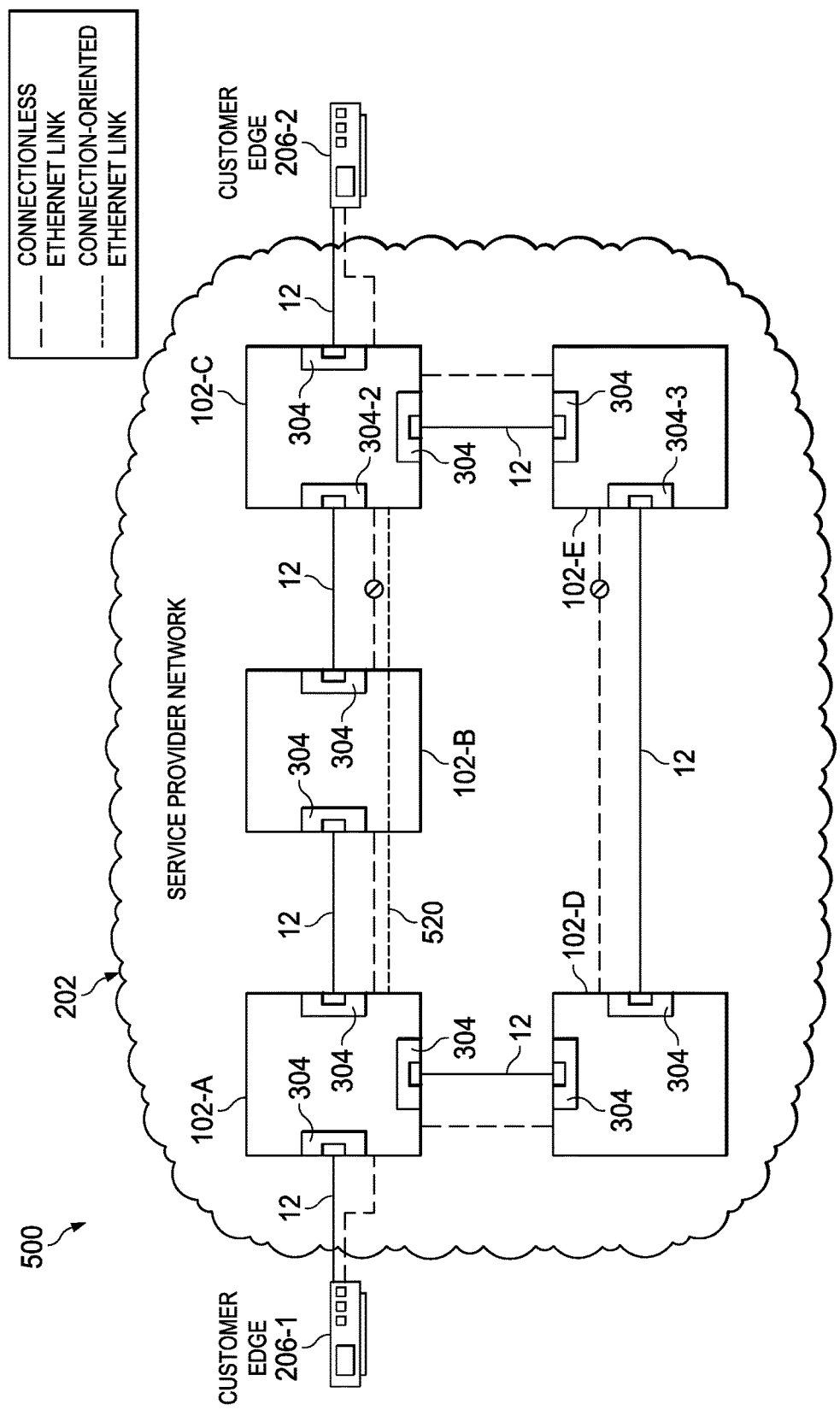
FIG. 5 is a block diagram of selected elements of yet another embodiment of a network architecture supporting connectionless and connection-oriented Ethernet according to the present disclosure.

Yet another combination of connectionless and connection-oriented Ethernet links is illustrated in FIG. 5. Again, customer edge device 206-1 may couple to customer edge device 206-2 via service provider network 202. Service provider network 202 may support connectionless and connection-oriented Ethernet links on the same ports 304 of the same network elements 102. For example, network elements 102-A and 102-C may be communicatively coupled via connection-oriented Ethernet link 520, and connectionless Ethernet links through network elements 102-A→102-B→102-C and network elements 102-A→102-D→102-E→102-C.

Because the service provider network 202 contains connectionless Ethernet links, a loop-breaking protocol may be used to prevent a network storm. Consistent with the enhancements to the loop-breaking protocol discussed above with respect to FIGS. 3 and 4, the loop-breaking protocol may block port 304-2 for connectionless Ethernet traffic while permitting connection-oriented Ethernet traffic to continue to pass. Thereby, connection-oriented Ethernet link 520 may continue to function even after the loop-breaking protocol has completed.

However, the loop-breaking protocol may be further configured to analyze and account for connection-oriented Ethernet links in the network when detecting and preventing network loops. In some embodiments, the loop-breaking protocol may be enhanced to account for connection-oriented Ethernet links between network elements 102 when scanning service provider network 202 for loops. By doing so, the loop-breaking protocol may identify that despite blocking port 304-2 for connectionless Ethernet traffic, a network loop still exists because of connection-oriented Ethernet link 520. For example, a link from network elements 102-A to 102-C may exist through connection-oriented Ethernet link 520, and connectionless Ethernet links through network elements 102-A→102-D→102-E→102-C. Therefore, a second port 304 may require blocking to ensure a loop-free network topology and thus a network free from network storm. For example, the loop-breaking protocol may be configured to block a second port (e.g., port 304-3) to render service provider network 202 loop free. If necessary, the loop-breaking protocol may continue to block ports 304 for connectionless Ethernet traffic, effectively disabling connectionless Ethernet links until all network loops have been disable. However, ports 304 within network elements 102 may continue to allow connection-oriented Ethernet traffic to pass within service provider network 202 to ensure connection-oriented Ethernet links are not disabled by the loop-breaking protocol.

Figure 6:
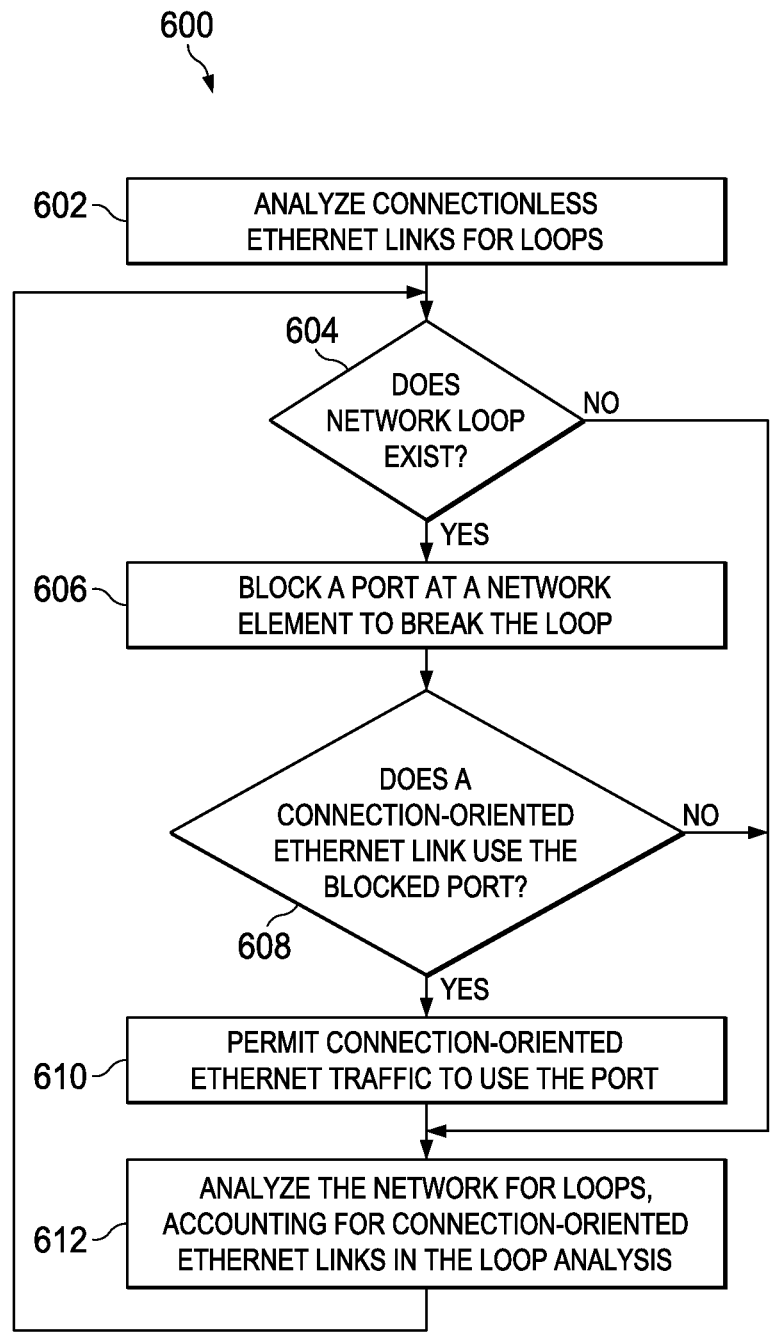
FIG. 6 is a flowchart depicting selected elements of an embodiment of a method for breaking network loops in a network that supports connectionless and connection-oriented Ethernet on the same network.

Extending the loop-breaking protocol to analyze and account for connection-oriented Ethernet links when scanning for network loops may be accomplished in any manner. For example, in some embodiments, a connection-oriented Ethernet link originating and/terminating between network elements 102 may be considered as a separate port at these elements by the loop-breaking protocol. Analyzing the connection-oriented Ethernet links as separate ports may allow the loop-breaking protocol to appropriately account for loops that may exist in the network topology as a result of both the connectionless and the connection-oriented Ethernet links using the same ports on the same network elements Turning now to FIG. 6, a block diagram of selected elements of an embodiment of method 600 for breaking network loops in a network that supports connectionless and connection-oriented Ethernet on the same network elements and ports. Method 600 may be implemented by network elements 102 disclosed above with respect to FIG. 1. It is noted that certain operations depicted in method 600 may be rearranged or omitted, as desired.

Method 600 may begin by analyzing the connectionless Ethernet links for loops (operation 602). Then, a determination may be made as to whether a network loop exists (operation 604). When the result of operation 604 is YES, the loop-breaking protocol may block a port at a network element to break the loop (operation 606). Next, a determination may be made as to whether a connection-oriented Ethernet link uses the blocked port (operation 608). When the result of operation 608 is YES, the blocked port may permit connection-oriented Ethernet traffic to continue to use the port (operation 610). Next, or when the result of operations 604 or 608 is NO, the loop-breaking protocol may analyze the network for loops again, this time accounting for connection-oriented Ethernet links in the loop analysis (operation 612). Based on the analysis in operation 612, a determination may again be made as to whether a network loop exists (operation 604). When the result of operation 604 is YES, the same steps described above starting at operation 606 may be repeated. Otherwise, the method for breaking network loops may be complete.

In some embodiments, method 600 may include one analysis step for detecting network loops. For example, although separate loop analyses are shown in operations 604 and 612, a single loop analysis may be sufficient to render the network loop-free. The single loop analysis may account for both connectionless and connection-oriented Ethernet paths within the network in determining the existence of loops and which ports to block in order to render a loop-free network topology. Thereby, the loop analyses shown in operations 604 and 612 may, in some embodiments of method 600, be combined into a single operation.

By enhancing existing loop-breaking protocols according to this disclosure, a network may concurrently support both connectionless and connection-oriented Ethernet. Further, the connectionless and connection-oriented Ethernet traffic may use the same ports of the same network elements within the same network. Additionally, the loop-breaking protocol may provide a loop-free topology to prevent a network storm, while not affecting the robustness and performance guarantees of connection-oriented Ethernet.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for breaking loops in an Ethernet network, comprising:

using a loop-breaking protocol to select a first port of a network element to block in order to break a network loop among a plurality of network elements that form a network;

determining whether traffic egressing from the first port is connectionless Ethernet traffic or connection-oriented Ethernet traffic;

blocking connectionless Ethernet traffic at the first port of the network element to break the network loop;

while blocking the connectionless Ethernet traffic, permitting connection-oriented Ethernet traffic to pass through the first port of the network element;

determining whether a second network loop exists among the plurality of network elements due to a connection-oriented Ethernet link within the plurality of network elements;

using the loop-breaking protocol to select a second port to block in order to break the second network loop;

blocking the connectionless Ethernet traffic at the second port to break the second network loop; and while blocking the connectionless Ethernet traffic, permitting connection-oriented Ethernet traffic to pass through the second port, wherein the loop-breaking protocol is a spanning tree protocol or an Ethernet Ring Protection Switching protocol.

2. The method of claim 1, wherein the loop-breaking protocol accounts for a connection-oriented Ethernet link within the network in determining whether the network loop exists.

3. The method of claim 2, wherein a starting port and an ending port of a connection-oriented Ethernet link within the network are considered separate ports of the network element by the loop-breaking protocol.

4. The method of claim 1, wherein at least one of a virtual local area network tag, a bit flag, and a protocol extension is used to determine whether Ethernet traffic is connectionless Ethernet traffic or connection-oriented Ethernet traffic.

5. A network element in an Ethernet network, comprising:
a processor;
non-transitory computer readable memory media accessible to the processor, wherein the memory media store processor-executable instructions, the instructions, when executed by the processor, cause the processor to:
execute a loop-breaking protocol to select a first port of the network element to block in order to break a network loop among a plurality of network elements that form a network;
block the connectionless Ethernet traffic at the first port of the network element to break the network loop;
while blocking the connectionless Ethernet traffic, permit a connection-oriented Ethernet traffic to pass through the first port of the network element;
analyze a connection-oriented Ethernet link within a plurality of network elements to determine if a second network loop exists among the plurality of network elements;
block the connectionless Ethernet traffic at a second port to break the network loop; and
while blocking the connectionless Ethernet traffic, permit a connection-oriented Ethernet traffic to pass through the second port,
wherein the loop-breaking protocol is a spanning tree protocol or an Ethernet Ring Protection Switching protocol.

6. The network element of claim 5, wherein the loop-breaking protocol accounts for a connection-oriented Ethernet link within the network in determining whether the network loop exists.

7. The network element of claim 6, wherein a starting port and an ending port of a connection-oriented Ethernet link within the network are considered separate ports of the network element by the loop-breaking protocol.

8. The network element of claim 5, wherein at least one of a virtual local area network tag, a bit flag, and a protocol extension is used to determine whether Ethernet traffic is connectionless Ethernet traffic or connection-oriented Ethernet traffic.

9. A network system, comprising:
a first customer sub-network;
a second customer sub-network;
a service provider network comprising a plurality of network elements, wherein the service provider network is configured to communicatively couple the first customer sub-network and the second customer sub-network through one or more connectionless Ethernet and connection-oriented Ethernet links across the plurality of network elements; and
a network element, among the plurality of network elements, is configured to:
execute a loop-breaking protocol to select a port of the network element to block in order to break a network loop among the plurality of network elements of the service provider network;
block the connectionless Ethernet traffic at the port of the network element to break the network loop;
while blocking the connectionless Ethernet traffic, permit a connection-oriented Ethernet traffic to pass through the port of the network element;
analyze a connection-oriented Ethernet link within a plurality of network elements to determine if a second network loop exists among the plurality of network elements;
block the connectionless Ethernet traffic at a second port to break the network loop; and
while blocking the connectionless Ethernet traffic, permit a connection-oriented Ethernet traffic to pass through the second port,
wherein the loop-breaking protocol is a spanning tree protocol or an Ethernet Ring Protection Switching protocol.

10. The network system of claim 9, wherein the loop-breaking protocol accounts for the connection-oriented Ethernet links between the plurality of network elements of the service provider network in determining whether the network loop exists.

11. The network element of claim 9, wherein at least one of a virtual local area network tag, a bit flag, and a protocol extension is used to determine whether Ethernet traffic is connectionless Ethernet traffic or connection-oriented Ethernet traffic.

* * * * *